(12) United States Patent
Tsuya

(10) Patent No.: US 9,952,818 B2
(45) Date of Patent: Apr. 24, 2018

(54) IMAGE READING APPARATUS AND METHOD FOR READING AN IMAGE

(71) Applicant: Seiji Tsuya, Aichi (JP)

(72) Inventor: Seiji Tsuya, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 157 days.

(21) Appl. No.: 13/853,246

(22) Filed: Mar. 29, 2013

(65) Prior Publication Data

US 2013/0258405 A1    Oct. 3, 2013

(30) Foreign Application Priority Data

Mar. 29, 2012    (JP) ................. 2012-077010

(51) Int. Cl.
*G06F 3/12* (2006.01)
*H04N 1/00* (2006.01)

(52) U.S. Cl.
CPC ....... *G06F 3/1293* (2013.01); *H04N 1/00225* (2013.01); *H04N 1/00228* (2013.01);
(Continued)

(58) Field of Classification Search
CPC .............. G06F 3/1293; H04N 1/00225; H04N 1/00228; H04N 1/00241; H04N 1/00962; H04N 2201/0094
See application file for complete search history.

(56) References Cited

U.S. PATENT DOCUMENTS 5,384,931 A * 1/1995 Hanson ............... A21B 3/16
                                                    15/1
5,473,536 A * 12/1995 Wimmer ................. 700/90
(Continued)

FOREIGN PATENT DOCUMENTS

JP    HEI 10-98574 A    4/1998
JP    2010-213189 A    9/2010
(Continued)

OTHER PUBLICATIONS

Japanese Office Action dated Jan. 5, 2016 issued in corresponding Japanese Patent Application No. 2012-077010.

*Primary Examiner* — Tammy Paige Goddard
*Assistant Examiner* — Frantz Bataille
(74) *Attorney, Agent, or Firm* — Scully, Scott, Murphy & Presser, P.C.

(57) ABSTRACT

An image reading apparatus connected with an information processing apparatus is provided. The image reading apparatus includes a specific parameter setting unit to set a parameter to be used in an image reading operation; an instruction receiving unit to receive input of an instruction to start reading of an image; a notification transmitting unit to transmit a read-start notification to the information processing apparatus; a parameter receiving unit to receive a parameter transmitted from the information processing apparatus in response to receipt of the read-start notification; and an image reading unit to read the image base on, at least with regard to the parameter set in the image reading apparatus, the parameter set by the specific parameter setting unit in place of the parameter transmitted from the information processing apparatus when the parameter transmitted from the information processing apparatus is received by the parameter receiving unit.

24 Claims, 9 Drawing Sheets

(52) U.S. Cl.
CPC ..... *H04N 1/00241* (2013.01); *H04N 1/00962* (2013.01); *H04N 2201/0094* (2013.01)

(56) References Cited

U.S. PATENT DOCUMENTS

| | | | | |
|---|---|---|---|---|
| 5,911,044 | A * | 6/1999 | Lo ...................... | H04N 1/00236 709/203 |
| 6,104,430 | A * | 8/2000 | Fukuoka .................... | 348/231.6 |
| 6,388,771 | B1 | 5/2002 | Tamaki | |
| 7,839,522 | B2 * | 11/2010 | Ohara ................ | H04N 1/00209 358/1.15 |
| 8,264,706 | B2 * | 9/2012 | Sato ................... | H04N 1/00222 358/1.14 |
| 8,381,232 | B2 * | 2/2013 | Kudo .................... | G06F 3/1204 710/15 |
| 2004/0114172 | A1 * | 6/2004 | Ohyama et al. ............. | 358/1.13 |
| 2005/0125576 | A1 * | 6/2005 | Yashiki .............. | H04N 1/00204 710/62 |
| 2007/0147230 | A1 * | 6/2007 | Yasuda .............. | H04N 1/00291 370/214 |
| 2008/0231912 | A1 * | 9/2008 | Murakata ........... | H04N 1/00872 358/474 |
| 2009/0059287 | A1 * | 3/2009 | Yamada ............. | H04N 1/00222 358/1.15 |
| 2009/0190163 | A1 * | 7/2009 | Sato .................... | H04N 1/00222 358/1.15 |
| 2009/0213415 | A1 * | 8/2009 | Shozaki ................. | G06K 15/02 358/1.15 |
| 2009/0249215 | A1 * | 10/2009 | Paek ................... | H04L 41/0816 715/740 |
| 2009/0279118 | A1 * | 11/2009 | Ito ......................... | G06F 21/608 358/1.14 |
| 2010/0079797 | A1 * | 4/2010 | Ohara ................ | H04N 1/00222 358/1.15 |
| 2010/0231964 | A1 * | 9/2010 | Watanabe .......... | H04N 1/00222 358/1.15 |
| 2010/0238458 | A1 * | 9/2010 | Sakuda et al. ................. | 358/1.2 |
| 2010/0245907 | A1 | 9/2010 | Yoshida | |
| 2010/0271661 | A1 * | 10/2010 | Ogino ......................... | 358/1.15 |
| 2011/0090543 | A1 | 4/2011 | Hashiguchi et al. | |
| 2011/0162037 | A1 * | 6/2011 | Kasahara ................ | G06F 21/64 726/1 |
| 2011/0199629 | A1 * | 8/2011 | Sensu et al. ................. | 358/1.13 |

FOREIGN PATENT DOCUMENTS

| | | |
|---|---|---|
| JP | 2010-239263 A | 10/2010 |
| JP | 2011-91531 A | 5/2011 |

\* cited by examiner

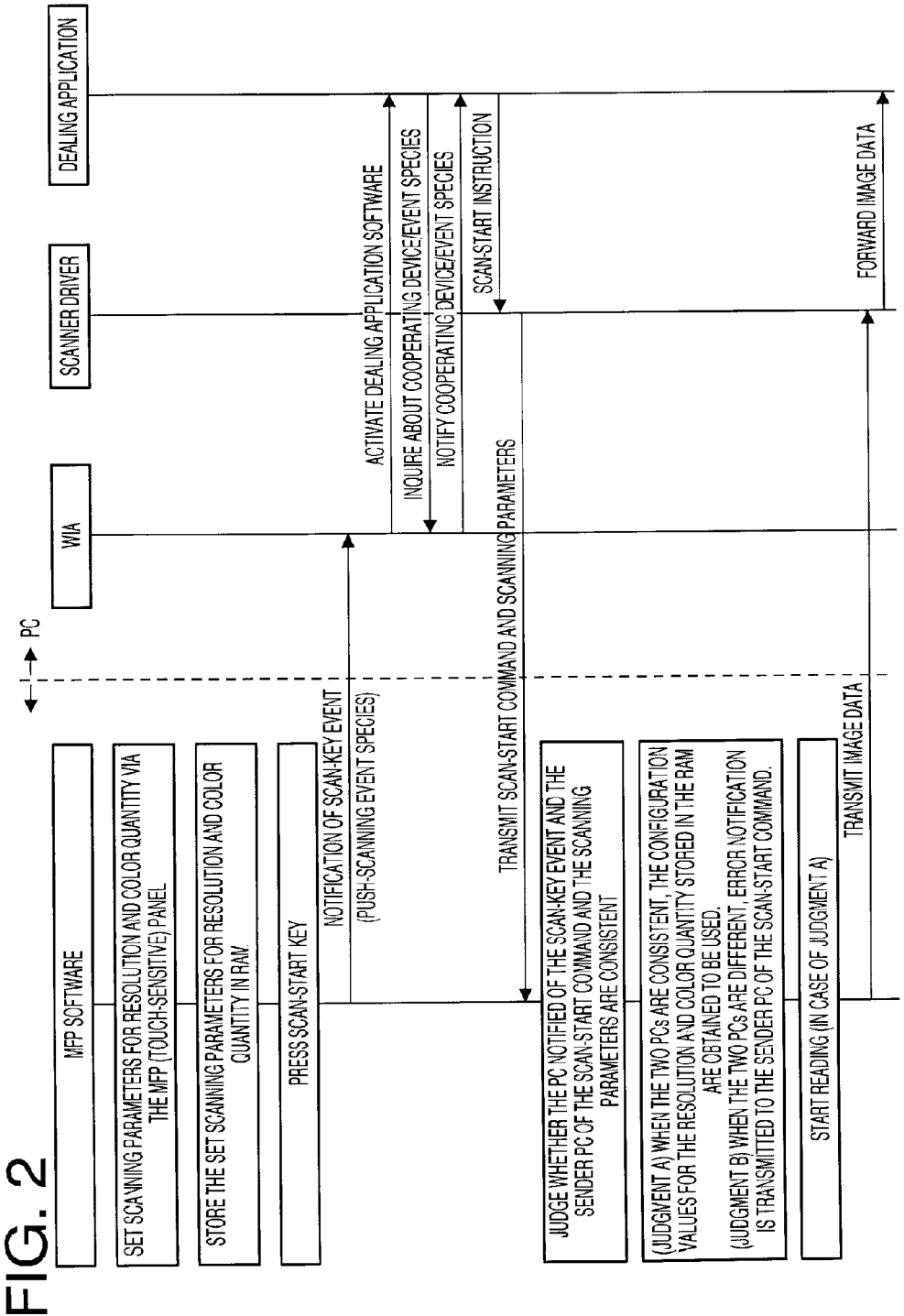

SCANNING MODE SELECTABLE SCREEN A

COLOR QUANTITY SELECTABLE SCREEN E

PC SELECTABLE SCREEN B

RESOLUTION SELECTABLE SCREEN F

SCANNING CONFIGURATION SELECTABLE SCREEN C

SCAN STARTER SCREEN G

SCANNING CONFIGURATION SETTING SCREEN D

PC IN-CONNECTION SCREEN H

IMAGE READING APPARATUS AND METHOD FOR READING AN IMAGE

CROSS REFERENCE TO RELATED APPLICATION

This application claims priority from Japanese Patent Application No. 2012-077010, filed on Mar. 29, 2012, the entire subject matter of which is incorporated herein by reference.

BACKGROUND

Technical Field

An aspect of the present invention relates to an image reading apparatus having a function to transmit image data, which is generated by reading an image in accordance with a reading instruction, to an external information processing apparatus and a method to read the image.

Related Art

An image reading apparatus, e.g., a scanner, for reading an image is often connected with an information processing apparatus, e.g., a personal computer (PC), for example, by a USB cable and through a local area network (LAN), and image data generated based on the read image may be transmitted from the image reading apparatus to the PC via the connection. The image reading apparatus may be operated in accordance with a so-called push-scanning method, in which scanning is started according to an instruction inputted in the image reading apparatus via an operating panel, and image data representing the read image is transferred to the PC after the scanning is completed.

More specifically, the push-scanning is generally conducted in a following sequence: When a button to activate the scanning behavior, which is arranged on the image reading apparatus, is touched or pressed, information (a scan-key event) to activate the scanning behavior is provided to the PC, and the PC activates a predetermined application program which deals with the scan-key event. The activated dealing application program processes the information and transmits a scan-start command and parameters to be used in the scanning to the image reading apparatus via a scanner driver program. The parameters to be used in the scanning behavior are information required by the image reading apparatus to read the image and may include configuration values for, for example, a reading resolution, a quantity of colors, brightness, and contrast to be used to reproduce the read image. The image reading apparatus receiving the scan-start command and the scanning parameters starts reading the image with reference to the settings indicated in the scanning parameters. When reading of the image is completed, image data which contains information representing the read image is transferred to the PC.

Thus, in the conventional push-scanning method, the configuration values (i.e., the scanning parameters) are often set by default in the dealing application program installed in the PC or by a user in advance prior to reading, and the set scanning parameters are transmitted from the PC to the image reading apparatus. The image reading apparatus receiving the values thus conducts reading of the image by use of the transmitted scanning parameters.

In such a conventional method, in which the scanning parameters are set in the PC via an input unit of the PC, once the scanning parameters are transferred to the image reading apparatus, it may be difficult to change the set scanning parameters in the image reading apparatus via an input unit of the image reading apparatus. Or, even though the scanning parameters can be changed in the PC, a user who is not familiar with operations in the PC may find it difficult to adjust the scanning parameters desirably via the PC. In consideration of the difficulty and inconvenience, an image reading apparatus, in which the scanning parameters can be set, rather than in PC, may be suggested.

SUMMARY

However, concerning the push-scanning method, while it is widely recognized that the scanning parameters are set in the PC and transmitted to the image reading apparatus, in order to achieve the configuration, in which the scanning parameters are set in the image reading apparatus, it may require a wide range of modification in software programs in both the PC and the image reading apparatus.

Moreover, the modification in software programs may undesirably increase an amount of data exchange between the image reading apparatus and the PC depending on mutual operability among the operating system, the scanner driver software in the PC, and the dealing application program. For example, the PC receiving the scan-key event from the image reading apparatus may request the image reading apparatus for the scanning parameters; the image reading apparatus may transmit the scanning parameters to the PC; the application program in the PC may obtain the scanning parameters transmitted from the image reading apparatus; the PC may recognize how the scanning would be conducted by use of the scanning parameters; the application program may once again return the scanning parameters to the image reading apparatus via the scanner driver software. Thus, redundant data exchange may be required, and an amount of data to be exchanged may be increased. In other words, communication efficiency may be lowered compared to the conventional push-scanning method.

Moreover, some of the scanning parameters may be set rather easily in the PC than in the image reading apparatus, and it may not necessarily be convenient that all the scanning parameters are set collectively in the image reading apparatus. Thus, the user may not necessarily find the image reading apparatus, in which the scanning parameters can be set collectively, convenient.

In consideration of the inconvenience, the present invention is advantageous in that an image reading apparatus with a push-scanning function, in which user's operability and convenience are improved, is provided. In particular, an image reading apparatus, in which parameters for reading an image can be configured without changing conventional procedures in an information processing apparatus or without changing a flow in communication with the information processing apparatus, is provided.

According to an aspect of the present invention, an image reading apparatus configured to perform an image reading operation and configured to be connected with an information processing apparatus for mutual communication is provided. The information processing apparatus is configured to contain at least one parameter to be used in the image reading operation and configured to transmit the contained at least one parameter to the image reading apparatus when a read-start notification transmitted from the image reading apparatus is received. The image reading apparatus includes a specific parameter setting unit configured to set the at least one parameter to be used in the image reading operation in the image reading apparatus; an instruction receiving unit configured to receive input of a predetermined instruction to start reading of the image; a notification transmitting unit configured to transmit the read-start notification to the information processing apparatus when the input of the predetermined instruction is received by the instruction receiving unit; a parameter receiving unit configured to receive the at least one parameter, which is transmitted from the information processing apparatus in response to receipt of the read-start notification from the notification transmitting unit; and an image reading unit configured to read the image base on, at least with regard to the at least one parameter set in the image reading apparatus, the at least one parameter set by the specific parameter setting unit in place of the at least one parameter transmitted from the information processing apparatus when the at least one parameter transmitted from the information processing apparatus is received by the parameter receiving unit.

According to another aspect of the present invention, a method to read an image by an image reading apparatus is provided. The image reading apparatus is configured to perform an image reading operation and configured to be connected with an information processing apparatus for mutual communication. The information processing apparatus is configured to contain at least one parameter to be used in the image reading operation and configured to transmit the contained at least one parameter to the image reading apparatus when a read-start notification transmitted from the image reading apparatus is received. The method includes setting the at least one parameter to be used in the image reading operation in the image reading apparatus; transmitting the read-start notification to the information processing apparatus when a predetermined instruction to start reading of the image is received in the image reading apparatus; reading the image base on, at least with regard to the at least one parameter set in the image reading apparatus, the at least one parameter set in the image reading apparatus in place of the at least one parameter transmitted from the information processing apparatus when the at least one parameter transmitted from the information processing apparatus is received.

According to another aspect of the present invention, an image reading apparatus configured to perform an image reading operation and configured to be connected with an information processing apparatus for mutual communication is provided. The information processing apparatus is configured to contain at least one parameter to be used in the image reading operation and configured to transmit the contained at least one parameter to the image reading apparatus when a read-start notification transmitted from the image reading apparatus is received. The image reading apparatus includes an image reading unit configured to read an image in accordance with the at least one parameter; a specific parameter setting unit configured to set the at least one parameter to be used in the image reading operation in the image reading apparatus; an instruction receiving unit configured to receive input of a predetermined instruction to start reading of the image; and a control device. The control device is configured to transmit the read-start notification to the information processing apparatus when a predetermined instruction to start reading of the image is inputted by the user via the instruction receiving unit; receive the at least one parameter, which is transmitted from the information processing apparatus in response to receipt of the read-start notification transmitted by the control device; and read the image base on, at least with regard to the at least one parameter set in the image reading apparatus, the at least one parameter set by the specific parameter setting unit in place of the at least one parameter transmitted from the information processing apparatus when the at least one parameter transmitted from the information processing apparatus is received.

According to another aspect of the present invention, an image reading system configured to perform an image reading operation in accordance with at least one reading parameter is provided. The image reading system includes an information processing apparatus configured to contain the at least one reading parameter to be used in the image reading operation; and an image reading apparatus connected with the information processing apparatus for mutual communication. The image reading apparatus includes a specific parameter setting unit configured to set the at least one parameter to be used in the image reading operation in the image reading apparatus; and a notification transmitting unit configured to transmit a read-start notification to the information processing apparatus when a predetermined instruction to read the image is inputted in the image reading apparatus. The information processing apparatus is configured to transmit the contained at least one reading parameter to the image reading apparatus in response to the read-start notification received from the image reading apparatus. The image reading apparatus further comprises a receiving unit configured to receive the at least one parameter, which is transmitted from the information processing apparatus in response to the read-start notification received from the notification transmitting unit; and an image reading unit configured to read the image base on, at least with regard to the at least one reading parameter set in the image reading apparatus, the at least one reading parameter set by the specific parameter setting unit in place of the at least one reading parameter transmitted from the information processing apparatus when the at least one reading parameter transmitted from the information processing apparatus is received by the receiving unit.

BRIEF DESCRIPTION OF THE ACCOMPANYING DRAWINGS

FIG. 2 is a ladder chart to illustrate flows of exchanges between a multifunction peripheral (MFP) and a PC when a push-scanning operation is conducted in the image reading system according to the embodiment of the present invention.

DETAILED DESCRIPTION

Figure 1:
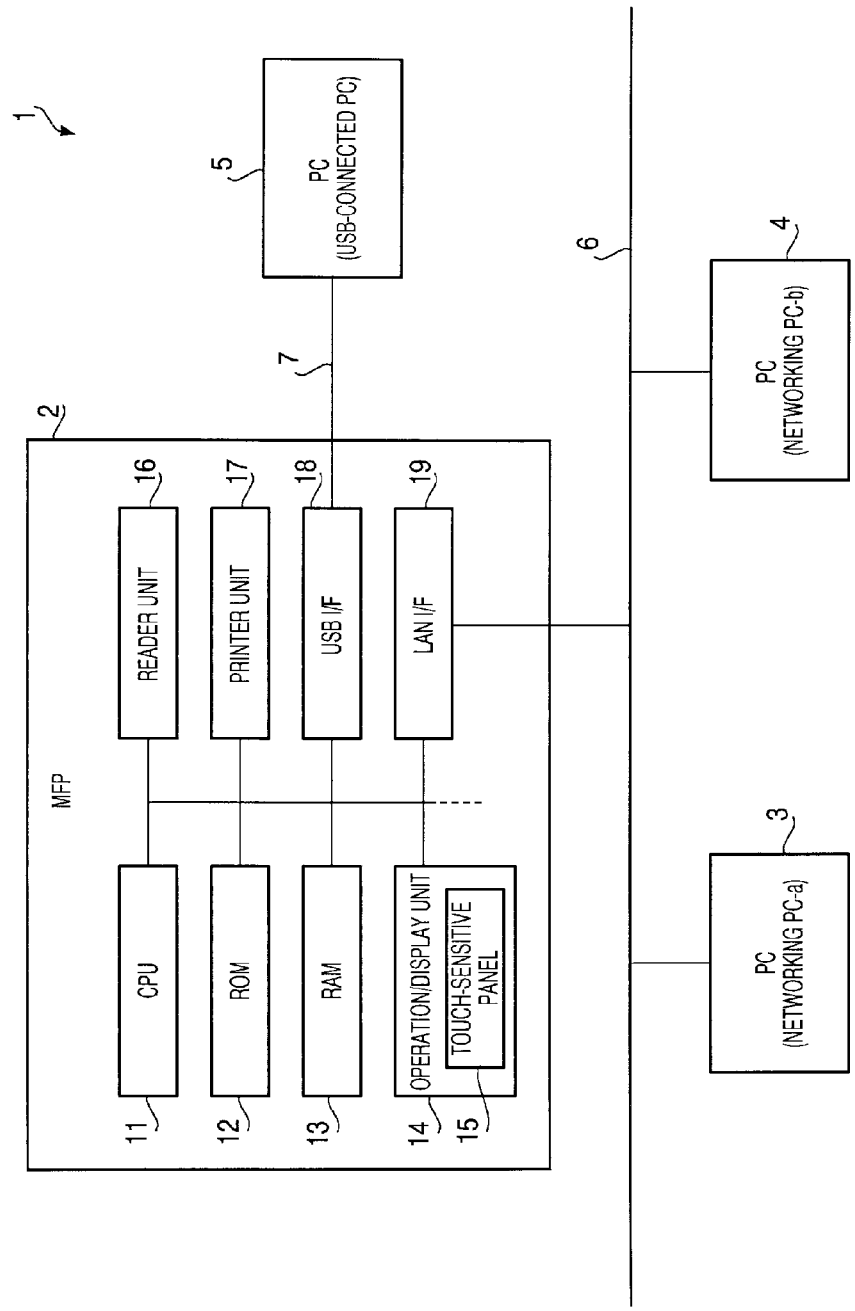
FIG. 1 is a block diagram to illustrate an overall configuration of an image reading system according to an embodiment of the present invention.

Hereinafter, an embodiment of the present invention will be described with reference to the accompanying drawings. It is noted that various connections are set forth between elements in the following description. These connections in general, and unless specified otherwise, may be direct or indirect, and this specification is not intended to be limiting in this respect.

An image reading system 1 according to the embodiment includes an MFP 2 and a plurality of PCs 3, 4, 5, which are connected to communicate with one another via networks. In particular, the PC 3 and the PC 4 are connected with the MFP 10 via a network 6, which is a wired local area network (LAN). It is to be noted that the network 6 may not necessarily a wired LAN but may be, for example, a wireless LAN. The PC 5 is connected with the MFP 10 via a universal serial bus (USB) 7.

The MFP 10 is a multi-functional device having a plurality of functions including an image reading function to read by scanning an image from an original medium, and a printing function to form an image on a recording medium such as a recording sheet and an OHP sheet. The MFP 10 is a network-enabled multi-functional device, of which functions can be shared with a plurality of users of the PCs 3, 4, 5.

The MFP 10 includes a CPU 11, a ROM 12, a RAM 13, an operation/display unit 14, a reader unit 16, a printer unit 17, a USB interface (I/F) 18, and a LAN interface (I/F) 19.

The CPU 11 controls the unit components in the MFP 10 and executes various calculations according to programs and data stored in the ROM 12. The programs in the ROM 12 include an in-MFP task processing program (see FIG. 5) and a PC-set scanning task processing program (see FIG. 9) to enable the image-reading function of the MFP 10. The RAM 13 is a memory device, which can be accessed by the CPU 11, and provides storage areas (see FIG. 4) to be referred to when the image-reading function is used.

The operation/display unit 14 includes a touch-sensitive panel 15, which displays information concerning behaviors and configuration of the MFP 10, and buttons (not shown), which are touched by a user to enter necessary instructions and information to manipulate the MFP 10.

The reader unit 16 includes an image sensor (not shown), by which an image appearing on an original medium is scanned, and generates image data representing the scanned image. The printer unit 17 prints an image on a recording medium. The USB interface 18 provides an interface between the MFP 10 and the PC 5 to exchange data there-between in accordance with a known USB standard. The LAN interface 19 is configured with a network interface card (NIC) to provide an interface between the MFP 10 with the PCs 3, 4.

A user using the MFP 10 may manipulate the operation/display unit 14 and select an operation mode (i.e., a function) of the MFP 10. For example, the user may view a main menu screen (not shown) displayed on the touch-sensitive panel 15 and select a scanner mode, in which the image reading function of the MFP 10 is enabled, or a printer mode, in which the printing function of the MFP 10 is enabled, by touching (e.g., tapping on) a predetermined button or area assigned to the function in the operation/display unit 14. When the user's selection is entered, the MFP 10 activates a predetermined processing flow to provide the selected function.

Figure 5:
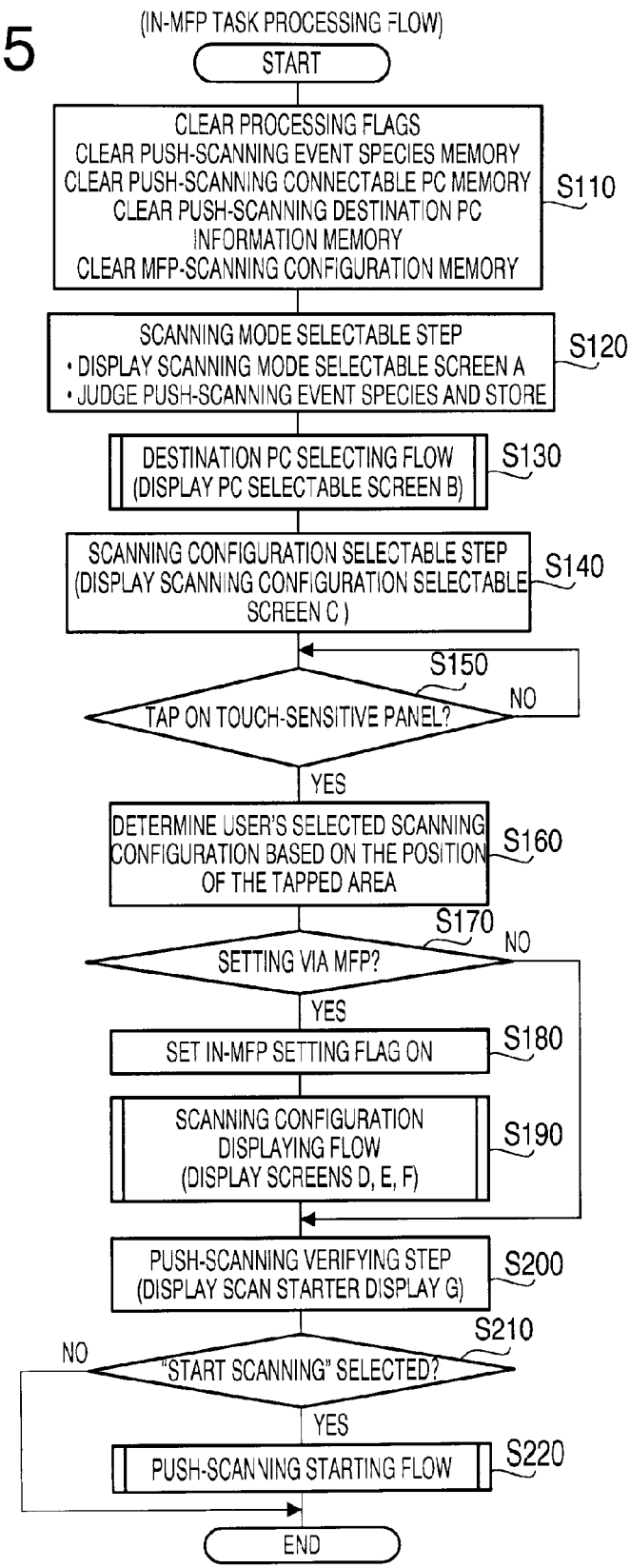
FIG. 5 is a flowchart to illustrate a flow of in-MFP task processing steps to be executed in the MFP in the image reading system according to the embodiment of the present invention.

When, for example, the scanner mode is selected, a screen to present more detailed operating options in the image reading function is displayed on the touch-sensitive panel 15. The options include a push-scanning function. When the user selects to use the push-scanning function, an operation to provide the push-scanning function is activated. In particular, the in-MFP task processing flow, which will be described later with reference to FIG. 5, is activated, and scanning parameters to execute the push-scanning operation are set.

The options in the scanning function include a pull-scanning operation, in which an instruction for scanning an image is inputted in the PC while the MFP 10 is not touched by a user. In order to enable both the push-scanning and pull-scanning operations, in the present embodiment, when the MFP 10 is powered on, the CPU 9 executes the PC-set scanning task processing flow shown in FIG. 9. Thereby, the MFP 10 can process either of the push-scanning or pull-scanning operation. When the push-scanning operation is activated, an image is read in the PC-set scanning task processing flow (see FIG. 9) by use of scanning parameters set in the in-MFP task processing flow (see FIG. 5).

The PCs 3, 4, and 5 are similarly in a known configuration, although the methods to be connected with the MFP 10 may be different. Each of the PCs 3, 4, 5 includes, although not shown, a CPU, a ROM, a RAM, a hard disk drive, a display unit including a liquid crystal display, an operation unit including a keyboard and a mouse, and communication interfaces. In the embodiment described below, unless otherwise noted by the reference signs, "the PC" refers to any one of the PCs 3, 4, 5.

In the hard disk drive of each PC 3, 4, 5, various software programs are installed. The programs may include an operating system (OS), application programs such as word processing application, spreadsheet application, image processing application, and driver software such as printer driver, and scanner driver. The programs further include application programs which deal with the push-scanning event to enable the push-scanning operation.

The application software dealing with the push-scanning event is programmed to set the scanning parameters for the push-scanning operation. When the application software is activated by a scan-key event notification, the application software transmits the set scanning parameters to the MFP 10. After transmitting the scanning parameters, the application software receives image data transmitted from the MFP 10 and may modify the image data. The application software may be provided to the user by a manufacturer of the MFP 10 along with the MFP 10 or by other software provider, and various kinds of application software are available.

In each of the PCs 3, 4, 5, a known OS (e.g., Windows; registered trademark) is installed. Windows provides a function called Windows Imaging Acquisition (WIA). WIA is one of application programming interfaces (API) supported by the Windows, which enables communication with peripheral devices such as an image reading apparatus and a digital camera to obtain image data from the peripheral devices.

Next, the push-scanning operation, which is executed in the image reading system 1 in the present embodiment, will be described in detail. The push-scanning operation in the present embodiment is, similarly to conventional push-scanning operations, conducted in accordance with the scanning parameters transmitted from the application program in the PC, which is notified of the scan-key event from the MFP 10. Based on these behaviors of the MFP 10 and the PC, unlike the conventional push-scanning operation, some of the scanning parameters can be set in the MFP 10. In particular, while items of the scanning parameters to be set and used in the push-scanning operation include configuration values concerning, for example, a quantity of colors, a resolution, contrast, brightness, and a scanning range, the parameters for the resolution and the quantity of colors may be MFP-configurable parameters, which can be set in the MFP 10. In other words, the remainder of the configuration values is set in the PC.

An overall sequence of the push-scanning operation will be described with reference to the ladder chart shown in FIG. 2. The ladder chart shown in FIG. 2 is based on assumption that the resolution and the quantity of colors to be used in the push-scanning operation are set in the MFP 10.

Figure 3A:
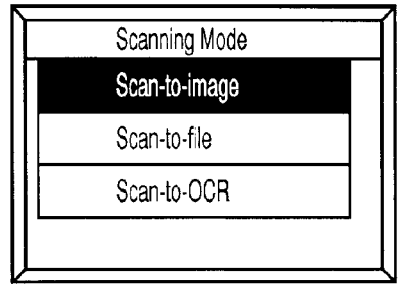
FIGS. 3A-3H are illustrative views of screens displayed on a touch-sensitive panel in the MFP when the push-scanning operation is conducted in the image reading system according to the embodiment of the present invention.
Figure 3E:
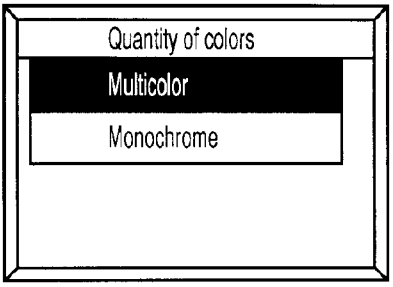
Figure 3B:
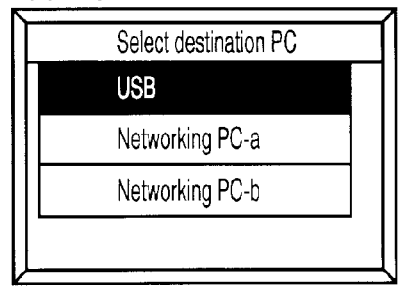
Figure 3F:
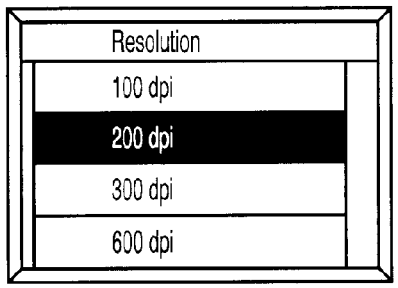

When the push-scanning operation is activated, the items which are configurable in the MFP 10, i.e., the resolution and the quantity of colors, are set by the user, who inputs the configuration values for the items via the touch-sensitive panel 15 of the MFP 10. The values are entered through a color quantity selectable screen E displayed on the touch-sensitive panel 15 (see FIG. 3E) and a resolution selectable screen F displayed on the touch-sensitive panel 15 (see FIG. 3F).

More specifically, when the push-scanning operation is activated, screens A-D shown in FIGS. 3A-3D are displayed on the touch-sensitive panel 15, and when the user selects one of the options, the screens E and F are displayed to set the scanning parameters. However, detailed description of the screens 3A-3F will be provided later.

When the scanning parameters for the resolution and the quantity of colors are selected, the selected parameters are temporarily stored in the RAM 13. In particular, the selected parameters are stored in an MFP-set scanning configuration memory 26 among storage areas 21-26 in the RAM 13 (see FIG. 4) to be the MFP-configurable parameters.

Thereafter, when the user touches (taps on) a scan-start key through a scan starter screen G (see FIG. 3G), the PC is notified of a scan-key event from the MFP 10. More specifically, the PC is notified of a push-scanning event species, which indicates a scanning method, by receiving a notification of the scan-key event from the MFP 10. The push-scanning event species is selected by the user via the scanning mode selectable screen A shown in FIG. 3A, which is displayed prior to setting the resolution and the quantity of colors via the scanning configuration setting screen D shown in FIG. 3D. The destination PC, which is to be notified of the scan-key event, is also selected by the user via a PC selectable screen B shown in FIG. 3B prior to setting the resolution and the quantity of colors via the resolution selectable screen F screen D.

When the PC is notified of the scan-key event by the MFP 10, the WIA in the PC recognizes the notification and activates a dealing application software, which is associated with the notified event (the push-scanning event species) to have the software to deal with the scan-key event. When activated, the dealing application software inquires of the WIA about the push-scanning event species, and the WIA responds to the inquiry. More specifically, the WIA informs the dealing application the push-scanning event species notified from the MFP 10 and that the MFP 10 is the cooperating device.

With the information provided from the WIA, the dealing application software transmits a scan-start command to the MFP 10 along with scanning parameters set in the dealing application software. The MFP 10, on the other hand, receives the scan-start command and the scanning parameters transmitted from the PC and examines whether the PC transmitted the scan-start command and the scanning parameters is consistent with the PC, to which MFP 10 transmitted the scan-key event earlier.

If the two PCs are judged to be consistent ("judgment A"), the MFP 10 starts scanning an image by using the scanning parameters stored in the MFP-set scanning configuration memory 26 in the RAM 13. More specifically, all of the scanning parameters transmitted from the PC to the MFP 10 are once stored in a PC scanning configuration memory 21 in the RAM 13 (see FIG. 4). Yet, the resolution and the quantity of colors transmitted from the PC are replaced with by the resolution and the quantity of colors stored in the MFP-set scanning configuration memory 26. Thereafter, scanning is conducted by use of the updated scanning parameters including the replacing resolution and quantity of colors.

If the two PCs are judged to be different ("judgment B"), the MFP 10 transmits an error notification to the sender PC of the scan-start command. In this case, scanning for the scan-start command is not conducted.

After scanning is completed, the MFP 10 transmits image data representing the read image to the PC. The PC receiving the image data transmitted from the MFP 10 forwards the image data to the dealing application software via the scanner driver. Thus, the dealing application software is enabled to process the image data.

Figure 4:
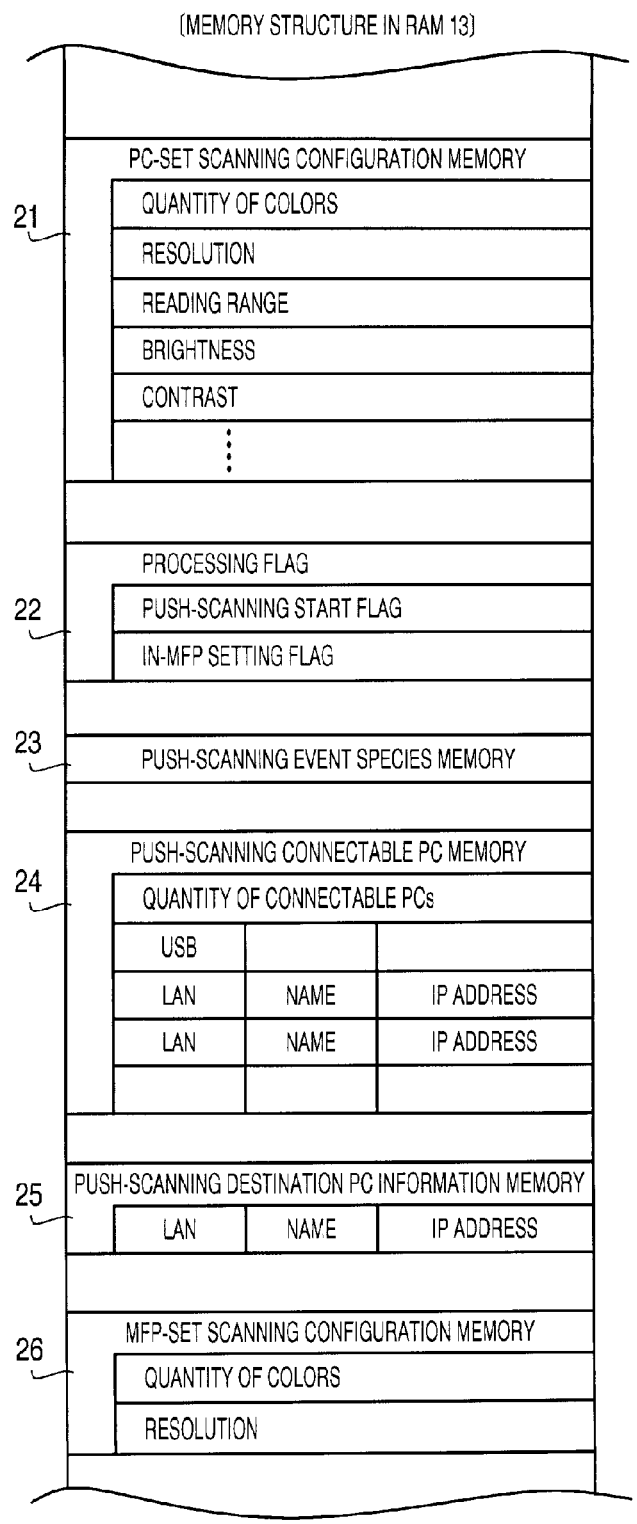
FIG. 4 shows an illustrative view of a memory structure in a RAM of the MFP in the image reading system according to the embodiment of the present invention.

The memory structure of the RAM 13 will be described. As shown in FIG. 4, the RAM 13 is configured to have storage areas 21-26, including memory areas and flag areas, which are to be referred to when the push-scanning operation is conducted. Among the plurality of storage areas 21-26, a PC-set scanning configuration memory 21 is an area, in which the scanning parameters (e.g., the resolution, the quantity of colors, a scanning range, brightness, contrast, etc.) to be used in the scanning operation are stored. In other words, the scanning operation is conducted by use of the scanning parameters stored in the PC-set scanning configuration memory 21.

A process flag 22 is an area, in which a push-scanning start flag and an in-MFP setting flag are stored. The push-scanning start flag is set "on" when the MFP 10 notifies the PC of the scan-key event. The in-MFP setting flag indicates whether the configuration values concerning the resolution and the quantity of colors set in the MFP 10 are to be used or the configuration values concerning the resolution and the quantity of colors transmitted from the PC are to be used.

A push-scanning event species memory 23 is an area, in which the push-scanning event species selected via the scanning mode selecting screen A (see FIG. 3A) displayed on the touch-sensitive panel 15.

A push-scanning connectable PC list memory 24 is an area, in which information concerning the PCs connected with the MFP 10 is stored. In particular, for each of the connected PCs, a connecting interface, a name, and IP addresses are stored.

A push-scanning destination PC information memory 25 is an area, in which information of the PC to be used in the push-scanning operation among the PCs 3, 4, 5 is stored. In other words, a connecting interface, a name, and an IP address of the PC to which the image data is transferred from the MFP 10 are indicated.

The MFP-set scanning configuration memory 26 is the area, in which the configuration values of the resolution and the quantity of colors selected by the user are stored when selection, that the resolution and the quantity of colors set in the MFP 10 are to be used, is made, and when the values for the resolution and the quantity of colors are inputted in the MFP 10 by the user.

Next, an in-MFP task processing flow and a PC-set scanning task processing flow, which are executed by the CPU 11 of the MFP 10, to provide the push-scanning function, will be described with reference to FIGS. 5-9.

The in-MFP task processing flow will be described with reference to FIG. 5. As has been described above, in the MFP 10, when the scanner mode is activated among the plurality of functions, and the push-scanning function is selected, the CPU 11 activates the in-MFP task processing flow.

In the in-MFP task processing flow, in S110, the CPU 11 clears (deletes) information stored in the processing flag 22, the push-scanning event species memory 23, the push-scanning connectable PC memory 24, the push-scanning destination PC information memory 25, and the MFP-set scanning configuration memory 26 in the RAM 13.

In S120, the CPU 11 executes a scanning mode selectable flow. More specifically, the CPU 11 controls the touch-sensitive panel 15 to display the scanning mode selectable screen A (see FIG. 3A) to prompt the user to select one of a plurality of scanning modes, which are scan-to-image, scan-to file, scan-to-OCR. When the user taps on a desired scanning mode among the plurality of scanning modes presented in the scanning mode selectable screen A to enter the user's selection, the selected scanning mode is determined to be the push-scanning event species and stored in the push-scanning event species memory 23 in the RAM 13.

Figure 6:
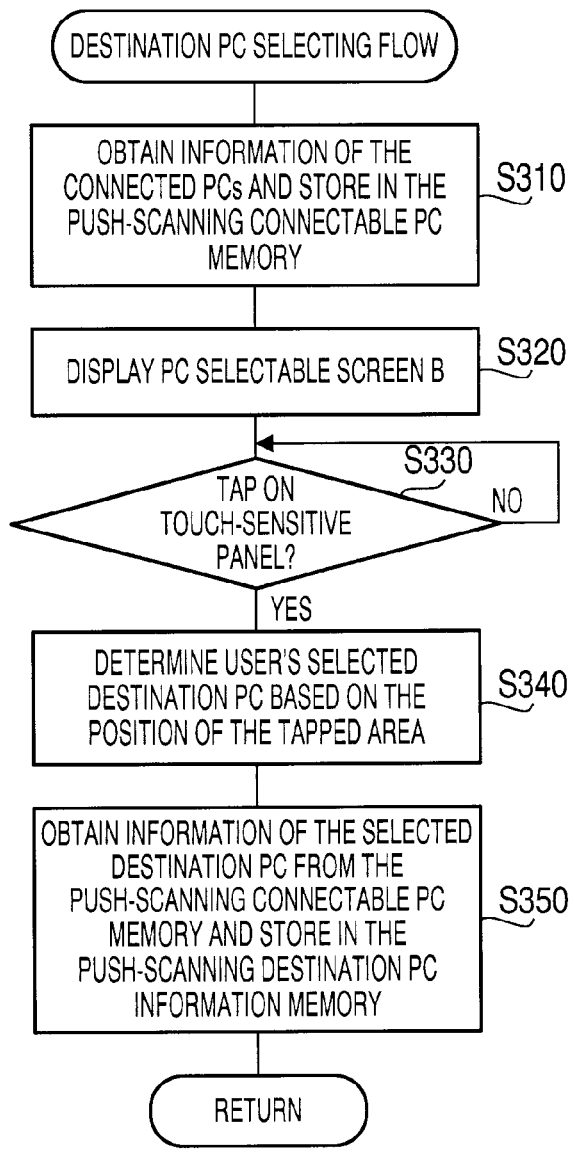
FIG. 6 is a flowchart to illustrate a flow of destination PC selecting steps to be executed in the MFP in the image reading system according to the embodiment of the present invention.

In S130, the CPU 11 executes a destination PC selecting flow, of which detailed steps are shown in FIG. 6. More specifically, as shown in FIG. 6, in S310, the CPU 11 obtains the information, i.e., connecting interfaces, names, and IP addresses, of the PCs connected with the MFP 10 and stores the obtained information in the push-scanning connectable PC memory 24. In S320, the CPU 1 displays a PC selectable screen B (see FIG. 3B) on the touch-sensitive panel 15. Thus, through the PC selectable screen B, the names of the PCs obtained in S310 are presented, and the user is prompted to select one of the presented PC.

In S330, the CPU 11 judges whether the touch-sensitive panel 15 with the PC selectable screen B being displayed is touched. If no touch on the touch-sensitive panel 15 is detected (S330: NO), the CPU 11 repeats S330. If the touch-sensitive panel 15 is touched (S330: YES), in S340, the CPU 11 determines which PC among the presented PCs has been selected to be the destination PC (i.e., a PC to which the image data is to be transferred after scanning) based on the location being touched. Thereafter, in S350, the CPU 11 obtains the information concerning the selected destination PC from the push-scanning connectable PC memory 24 and stores in the push-scanning destination PC information memory 25 in the RAM 13. The flow returns to the in-MFP task processing flow (FIG. 5).

In S140 in the in-MFP task processing flow, the CPU 11 displays a scanning configuration selectable screen C (see FIG. 3C) on the touch-sensitive panel 15. Thereby, the user is prompted to select between options: that the resolution and the quantity of colors set in the PC are validated to be used; and that the resolution and the quantity of colors set in the MFP 10 via the touch-sensitive panel 10 are validated to be used.

After displaying the scanning configuration selectable screen C, in S150, the CPU 11 judges whether the touch-sensitive panel 15 is touched by the user. If no touch on the touch-sensitive panel 15 is detected (S150: NO), the CPU 11 repeats S150. If the touch-sensitive panel 15 is touched (S150: YES), in S160, the CPU 11 judges which configuration values, between the values set in the PC and the values set in the MFP 10, are selected by the user and determines the scanning parameters to be used. The flow proceeds to S170.

In S170, the CPU 11 judges whether the option of using the scanning configuration set via the touch-sensitive panel 15 in the MFP 10 is selected based on the judgment made in S160. In S170, if the option of using the scanning configuration set in the MFP 10 (i.e., "Set in PC" in the scanning configuration selectable screen C) is not selected (S170: NO), the flow proceeds to S200. If the option of using the scanning configuration set via the touch-sensitive panel 15 in the MFP 10 (i.e., "Set in PC" in the scanning configuration selectable screen C) is selected (S170: YES), in S180, the CPU 11 sets the in-MFP setting flag in the processing flag 22 "on," and in S190, the CPU 11 executes the scanning configuration displaying flow.

Figure 7:
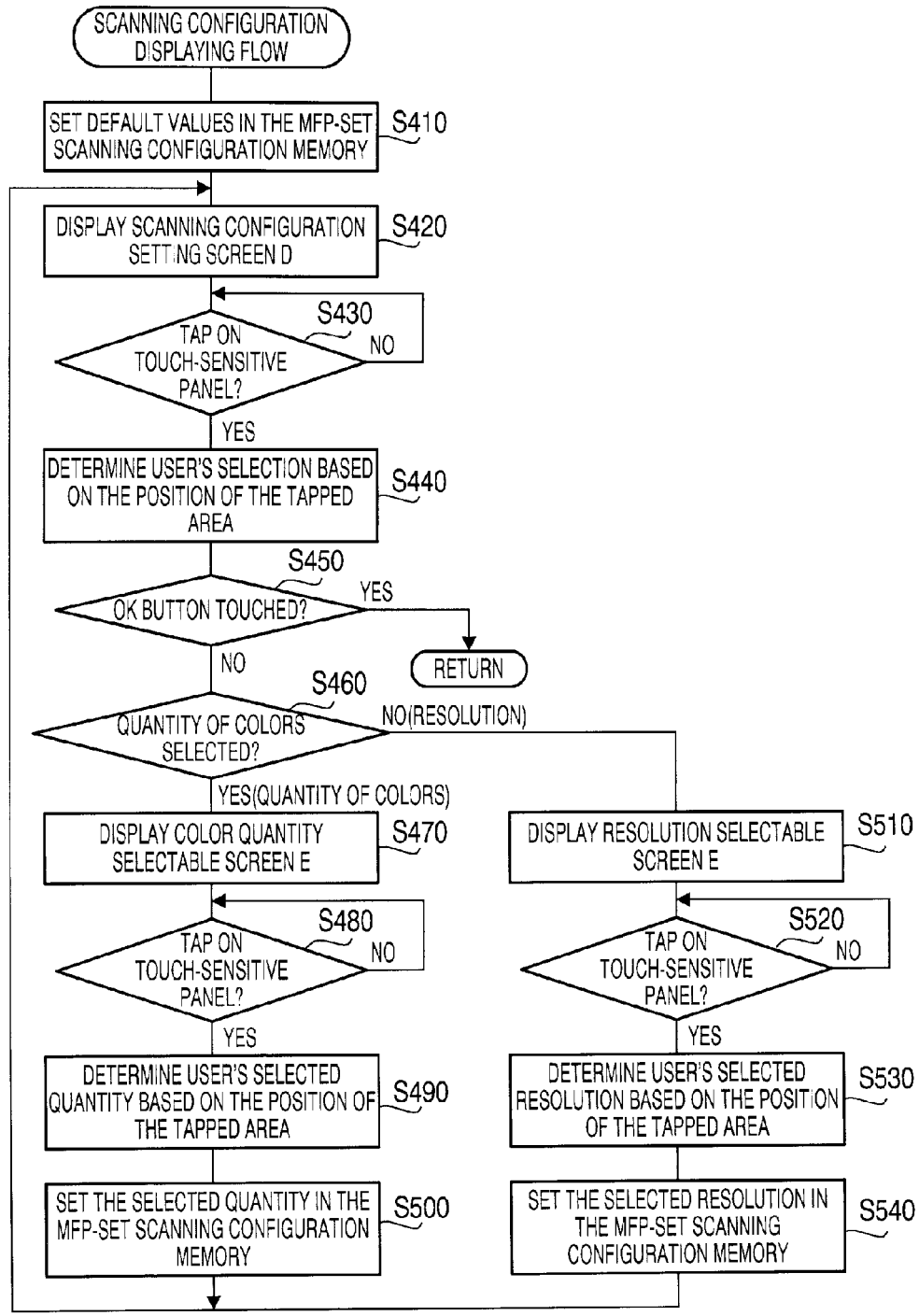
FIG. 7 is a flowchart to illustrate a flow of scanning configuration displaying steps to be executed in the MFP in the image reading system according to the embodiment of the present invention.

Steps in the scanning configuration displaying flow are shown in FIG. 7. When the flow starts, in S410, the CPU 11 sets predetermined default values in the areas for the quantity of colors and the resolution in the MFP-set scanning configuration memory 26 in the RAM 13. The default values are initially set in the MFP 10 in advance of activation of the in-MFP task processing flow. In S420, the CPU 11 displays a scanning configuration setting screen D (see FIG. 3D) on the touch-sensitive panel 15. Thereby, the user is prompted to select one of the options to be set in the PC, between the quantity of colors and the resolution.

After displaying the scanning configuration setting screen D, in S430, the CPU 11 judges whether the touch-sensitive panel 15 is touched by the user. If no touch on the touch-sensitive panel 15 is detected (S430: NO), the CPU 11 repeats S430. If the touch-sensitive panel 15 is touched (S430: YES), in S440, the CPU 11 determines which option button has been selected by the user based on the location being touched. Thereafter, in S450, the CPU 11 judges whether an "OK" button displayed on the scanning configuration setting screen D has been touched. If the "OK" button has been touched (S450: YES), the flow proceeds to S200 (see FIG. 5). If the "OK" button has not been touched (S450: NO), the flow proceeds to S460, and the CPU 11 judges whether the option "quantity of colors" has been selected by the user.

In S460, if the option "quantity of colors" has been selected (S460: YES), in S470, the CPU 11 displays a color quantity selectable screen E (see FIG. 3E) on the touch-sensitive panel 15. Thereby, the user is prompted select one of the options for the quantity of colors to be set in the scanning operation. In the present example, the options for the color quantity include, but not limited to, "multicolor" and "monochrome." If the option "quantity of colors" has not been selected (S460: NO), the flow proceeds to S510.

After displaying the color quantity selectable screen E, in S480, the CPU 11 judges whether the touch-sensitive panel 15 is touched by the user. If no touch on the touch-sensitive panel 15 is detected (S480: NO), the CPU 11 repeats S480. If the touch-sensitive panel 15 is touched (S480: YES), in S490, the CPU 11 determines the quantity of colors which has been selected by the user based on the location being touched. Thereafter, in S500, the CPU 11 sets the selected quantity of colors in the area for the quantity of colors in the MFP-set scanning configuration memory 26 in the RAM 13 based on the judgment made in S490. The flow returns to S420.

Meanwhile, in S460, if the option "quantity of colors" has not been selected (S460: NO), but the option "resolution" has been selected, in S510, the CPU 11 displays a resolution selectable screen F (see FIG. 3F), in which a plurality of optional resolutions are presented on the touch-sensitive panel 15. Thereby, the user is prompted to select one of the optional resolutions. In the present example, the optional resolutions include, but not limited to, 100 dpi, 200 dpi, 300 dpi, and 600 dpi.

After displaying the resolution selectable screen F, in S520, the CPU 11 judges whether the touch-sensitive panel 15 is touched by the user. If no touch on the touch-sensitive panel 15 is detected (S520: NO), the CPU 11 repeats S520. If the touch-sensitive panel 15 is touched (S520: YES), in S530, the CPU 11 determines the value for the resolution which has been selected by the user based on the location being touched. Thereafter, in S540, the CPU 11 sets the selected resolution in the area for the resolution in the MFP-set scanning configuration memory 26 in the RAM 13 based on the judgment made in S530. The flow returns to S420.

Through S420-S450, the CPU 11 displays the scanning configuration setting screen D (see FIG. 3D) on the touch-sensitive panel 15 in S420, and when the "OK" button is touched (S450: YES), the flow proceeds to S200 (see FIG. 5). In S200, the CPU 11 displays a scan starter display G (see FIG. G). Thereby, the user is prompted to select an option between "start scanning" and "cancel." In S210, the CPU 11 judges whether the "start scanning" has been selected, and if the "start scanning" has not been selected (S210: NO), but the "cancel" has been selected, the CPU 11 terminates the in-MFP task processing flow. On the other hand, if the "start scanning" has been selected (S210: YES), in S220, a push-scanning starting flow is activated.

Figure 8:
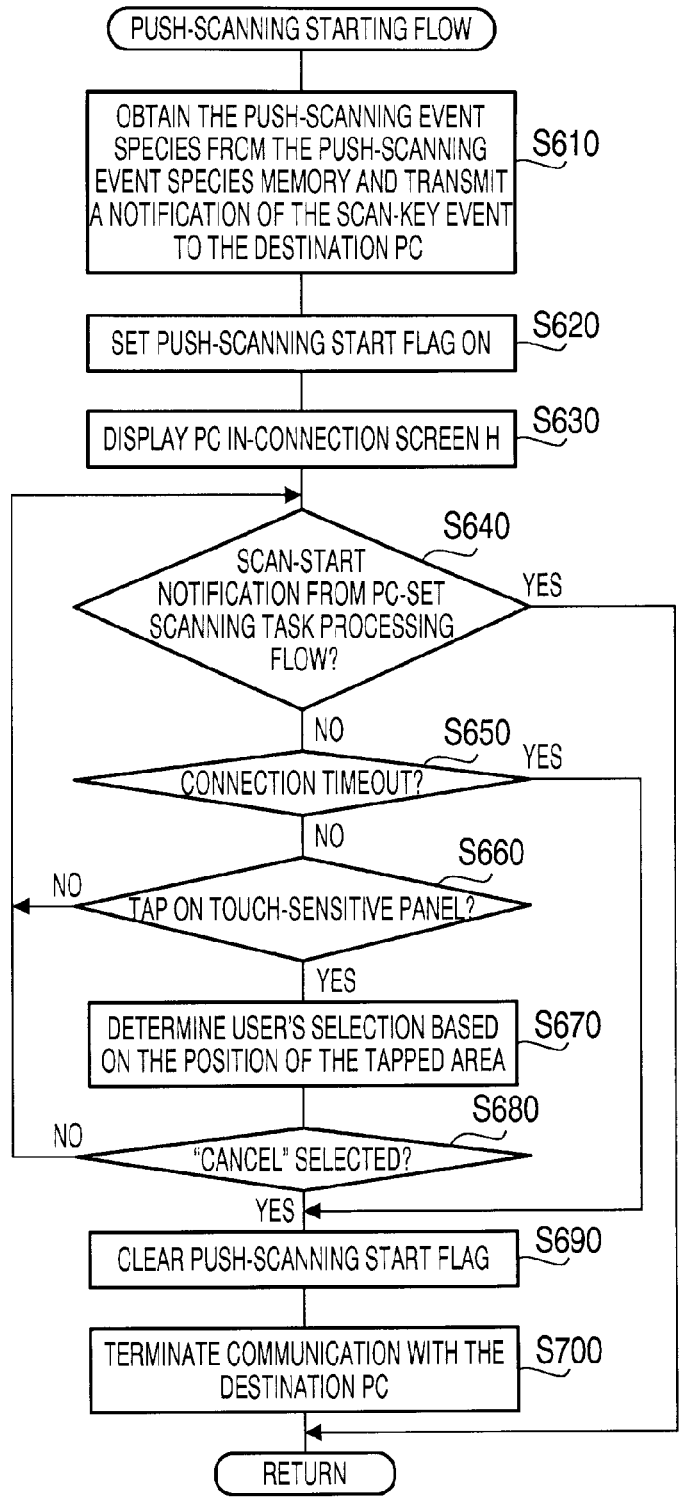
FIG. 8 is a flowchart to illustrate a flow of push-scanning starting steps to be executed in the MFP in the image reading system according to the embodiment of the present invention.

Steps in the push-scanning starting flow are shown in FIG. 8. When the flow starts, as shown in FIG. 8, in S610, the CPU 11 obtains the push-scanning event species from the push-scanning event species memory 23 in the RAM 13 and transmits a notification of the scan-key event to the destination PC. In S620, the CPU 11 sets a push-scanning start flag in the processing flag 22 in the RAM 13. In S630, the CPU displays a PC in-connection screen H (see FIG. 3H) on the touch-sensitive panel 15. Thereby, the user is informed that the MFP 10 is communicating with the PC.

After displaying the PC in-connection screen H, in S640, the CPU 11 judges whether a scan-start notification is received from a PC-scanning task flow (see FIG. 9), which runs separately in parallel with the in-MFP task processing flow. If the scan-start notification has been received (S640: YES), the push-scanning starting flow ends, and accordingly, the in-MFP task processing flow in FIG. 5 ends thereafter. When no scan-start notification has been received (S640: NO), in S650, the CPU 11 judges whether the connection between the MFP 10 and the destination PC has reached timeout, i.e., whether a predetermined length of time has elapsed after the transmission of the scan-key event without receiving the scan-start notification from the PC-set scanning task processing flow.

In S650, if the CPU 11 determines that the connection has reached timeout (S650: YES), in S690, the push-scanning start flag in the RAM 13 is cleared, and in S700, the communication with the destination PC is terminated. Thus, the push-scanning starting flow ends thereat, and accordingly, the in-MFP task processing flow ends thereafter.

Meanwhile, if the connection has not reached timeout yet (S650: NO), in S660, while the PC in-connection screen H is displayed on the touch-sensitive panel 15, the CPU 11 judges whether the touch-sensitive panel 15 is touched by the user. In the PC in-connection screen H, a "cancel" button is displayed, and when the user taps on the cancel button to select canceling the push-scanning operation, the current push-scanning operation is aborted. Thus, in the steps S660-S680, the CPU 11 judges whether the "cancel" button has been selected.

In particular, in S660, if the CPU 11 determines that the touch-sensitive panel 15 is touched by the user, in S670, the CPU 11 determines the button which has been selected by the user based on the location being touched. In S680, the CPU 11 judges whether the "cancel" button has been selected based on the judgment made in S670. If the "cancel" button has been selected (S680: YES), the flow proceeds to S690-S700, and the in-MFP task processing flow ends thereafter.

Figure 9:
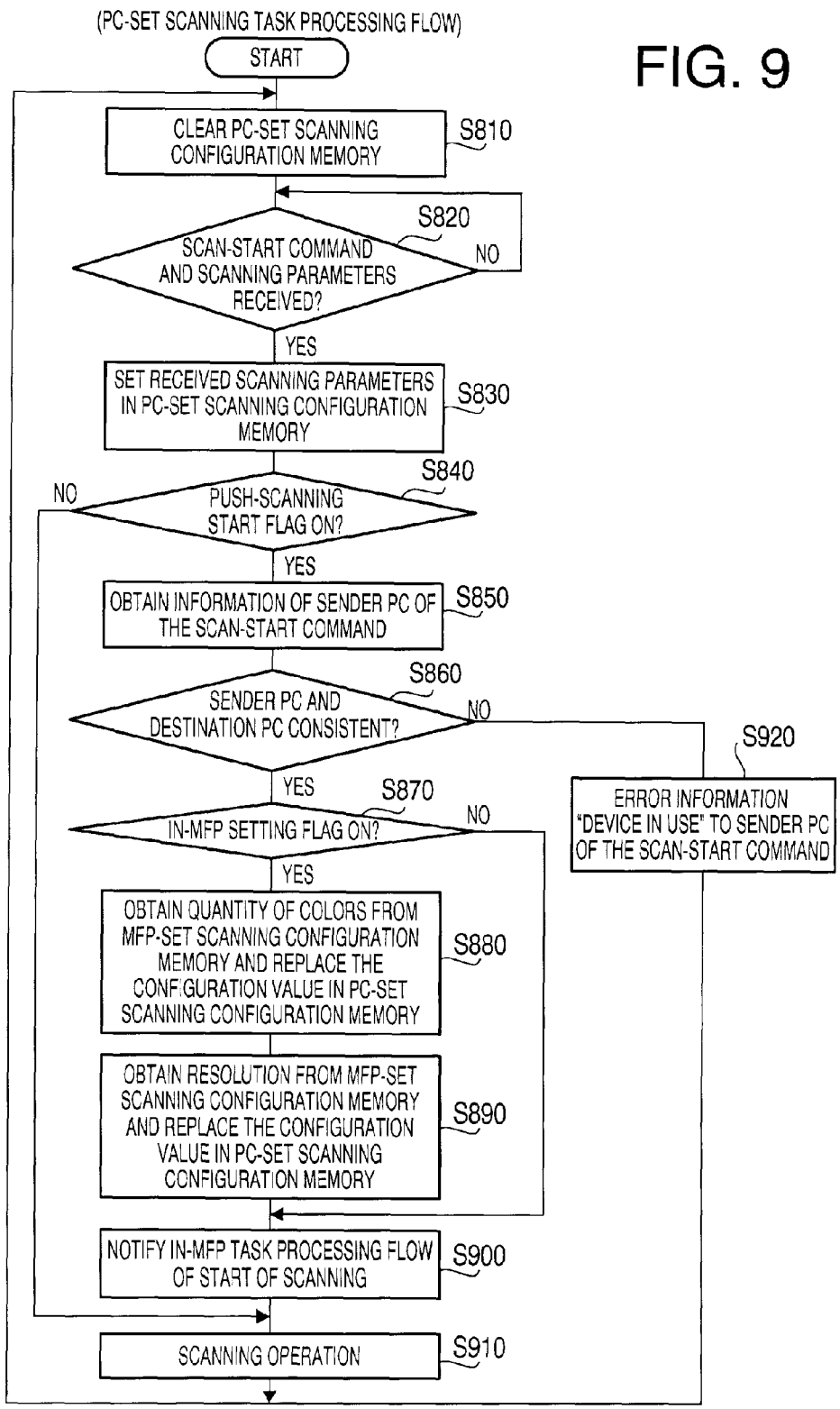
FIG. 9 is a flowchart to illustrate a flow of PC-set scanning task processing steps to be executed in the PC in the image reading system according to the embodiment of the present invention.

Next, a PC-set scanning task processing flow, which is conducted upon activation of the MFP 10 (or the CPU 11), will be described with reference to FIG. 9. When the PC-set scanning task processing flow starts, in S810, the CPU 11 clears the scanning parameters stored in the PC-set scanning configuration memory 21. In S820, the CPU 11 judges whether a scan-start command and scanning parameters have been received from an external PC, which is one of the PCs 2, 4, 5 connected with the MFP 10. If no scan-start command or scanning parameters has been received (S820: NO), the CPU 11 repeats S820. If the scan-start command and the scanning parameters have been received (S820: YES), in S830, the CPU 11 sets the received scanning parameters in the predetermined areas in the PC-set scanning configuration memory 21 in the RAM 13.

In S840, the CPU 11 judges whether the push-scanning start flag is set in the processing flag 22 in the RAM 13. If the push-scanning start flag is not set, while the scanning parameters have been received from an external PC even though the MFP 10 is not conducting a push-scanning operation, it is determined that the external PC conducted a pull-scanning operation. Therefore, the flow proceeds to S910, and a scanning operation is conducted. The scanning operation in S910 includes reading the image by use of the scanning parameters stored in the PC-set scanning configuration memory 21 in the RAM 21 and transmitting image data generated based on the read image to the external PC.

Meanwhile, in S840, if the push-scanning start flag is set in the processing flag 22 in the RAM 13 (S840: YES), in S850, the CPU 11 obtains information concerning the sender PC of the scan-start command received in S820. The information concerning the sender PC may be obtained, for example, based on header data, which is transmitted along with the scan-start command, to identify the sender PC.

Following S850, in S860, the CPU 11 examines whether the sender PC obtained in S850 and the destination PC stored in the push-scanning destination PC information memory 25 in the RAM 13 are consistent. In other words, consistency between the destination PC, to which the MFP 10 transmitted the scan-key event in S610 (FIG. 8), and the sender PC who transmitted the scan-start command thereafter, is examined.

In S860, if the sender PC obtained in S850 and the destination PC stored in the push-scanning destination PC information memory 25 in the RAM 13 are not consistent (S860: NO), it is assumed that a user of a different PC, which is different from the destination PC, may have erroneously interposed a pull-scanning operation to interrupt the push-scanning operation. In this regard, the interruption by the pull-scanning operation by the different PC user should be denied; therefore, in S920, error information, which indicates that the MFP 10 is in use (i.e., the MFP 10 is currently occupied by the push-scanning operation) and that the interrupting scanning instruction should not be accepted, is transmitted to the external PC being the sender of the scan-start command. The flow returns to S810.

Figure 3C:
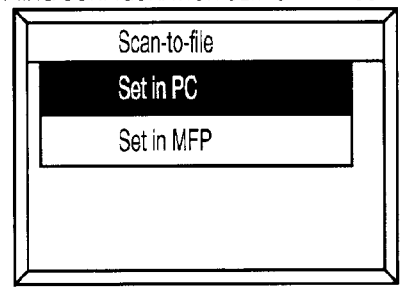
Figure 3G:
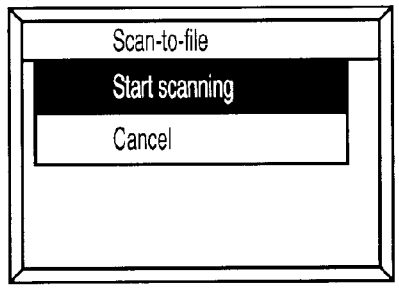
Figure 3D:
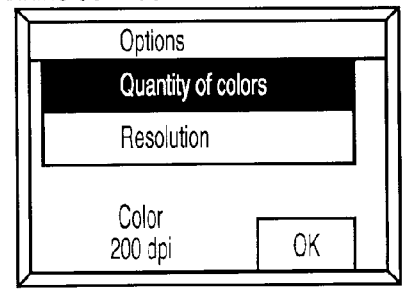
Figure 3H:
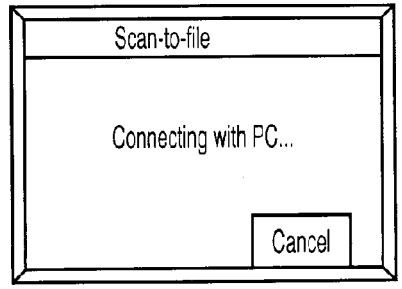

Meanwhile, in S860, if the sender PC obtained in S850 and the destination PC stored in the push-scanning destination PC information memory 25 in the RAM 13 are consistent (S860: YES), in S870, the CPU 11 judges whether the in-MFP setting flag is set in the processing flag 22 in the RAM 13. In other words, it is judged whether the option "set in MFP", which indicates that the resolution and the quantity of colors set in the MFP 10 are to be used, has been selected in the scanning configuration selectable screen C (FIG. 3C).

In S870, if the in-MFP setting flag is not set (S870: NO), it is determined that the scanning parameters set in the PC, including the quantity of colors and the resolutions, are to be used for the push-scanning operation. Therefore, the flow proceeds to S900, and the CPU 11 notifies the separately running in-MFP task processing flow (see FIG. 5) of start of the push-scanning operation. With the notification of the scan-stat, affirmative judgment is made in S640 in the in-MFP task processing flow (see FIG. 8). The flow proceeds to S910, and a scanning operation is conducted. In the scanning operation in S910, the image is read in accordance with the scanning parameters provided by the PC.

Meanwhile, in S870, if the in-MFP setting flag is set (S870: YES), it is determined that the scanning parameters set in the MFP, i.e., the quantity of colors and the resolution, are to be used for the push-scanning operation. Therefore, in S880, the CPU 11 obtains the quantity of the colors from the MFP-set scanning configuration memory 26 in the RAM 13 and replaces the quantity of colors set in the PC-set scanning configuration memory 21 with the obtained quantity. Further, in S890, the CPU 11 obtains the resolution from the MFP-set scanning configuration memory 26 in the RAM 13 and replaces the resolution set in the PC-set scanning configuration memory 21 with the obtained resolution.

Thus, the quantity of colors and the resolution set in the PC-set scanning configuration memory 21 are replaced with the configuration values set in the MFP 10 to process S900-S910. Therefore, when the push-scanning operation is conducted, the configuration values, including the quantity of colors and the resolutions which are set in the MFP 10, are used.

According to the image reading system 1 described above, while the basic configuration, in which the scanning parameters are transmitted from the PC to the MFP 10, is maintained, the quantity of colors and the resolution are configurable in the MFP 10. Further, the user of the MFP 10 can make selection, between the quantity of colors and the resolution having been set in the MFP 10 and the quantity of colors and the resolution having been set in the PC and transmitted, within the MFP 10. Therefore, when the scanning parameters set in the MFP 10 are selected to be used, concerning the quantity of colors and the resolution, the configuration values set in the MFP 10 via the operation/display unit 14 are used.

Thus, while the procedure to be conducted in the PC is maintained unchanged, and the communication procedures between the MFP 10 and the PC are maintained unchanged, a part of the scanning parameters, e.g., the quantity of colors and the resolution, can be set in the MFP 10. Accordingly, usability for the user can be effectively improved.

According to the image reading system 1 described above, the default value for the quantity of colors and the default value for the resolution are initially set. Therefore, if there is no preference for the user, the default values for the quantity of colors and the resolution are employed in the push-scanning operation; therefore, the user can effectively omit the procedure to set the scanning parameters. On the other hand, when the user has preferences concerning the quantity of colors and/or the resolution, the user can select to change the scanning parameters. Therefore, the push-scanning operation according to the user's preferred scanning parameters can be effectively provided.

In the image reading system 1 described above, not all the scanning parameters can be set in the MFP 10, but the scanning parameters which can be set in the MFP 10 are limited (e.g., the quantity of colors and the resolution). It is to be noted that all the scanning parameters may be similarly set in the MFP 10, however, when all of the scanning parameters should be set in the MFP 10, the data exchange between the MFP 10 and the PC would require more resources (e.g., memories, burden on the CPU 11, etc.).

Meanwhile, the MFP 10 is equipped with a smaller quantity of and smaller-sized input/output devices (e.g., operation buttons, keys, and the touch-sensitive panel 15) compared to those in the PCs. Therefore, when all the scanning parameters should be set in the MFP 10, inputting all the necessary scanning parameters via those relatively difficult-to-manage input/output devices may cause inconvenience and may produce burden on the user. Thus, such configuration may not necessarily be welcomed by the user who is not familiar with the behaviors of the input/output devices in the MFP 10. Rather, it may be convenient for the user when the modifiable scanning parameters, which can be modified or adjusted by the user in the MFP 10, are limited. Even for an experienced user, and even when all the scanning parameters can be modified via the PC 10, it may be easier to modify the configuration values in the PC when the detailed modification of the configuration values is required. Ultimately, the function of the MFP 10, by which all the scanning parameters can be changed, may not be advantageously utilized. Therefore, as has been described in the above embodiment, with the scanning parameters which can be set in the MFP 10 being limited to a few items, the improved usability and convenience of the MFP 10 are provided to the user while increase of the resources is avoided.

Further, according to the embodiment described above, even when the configuration values for the quantity of colors and the resolution are validly set in the MFP 10, when the destination PC, to which the MFP 10 sends the scan-key event, and the sender PC, who sends the scan-start command to be received in the MFP 10 after sending the scan-key event, do not coincide with each other, the MFP 10 returns error information to the sender PC of the scan-start command. Thereby, an inconsistent scanning operation for the scan-start command is prevented from being conducted. Thus, the MFP 10 can provide a reliable scanning function.

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the configuration values of the quantity of colors and the resolution may not always be changed in solely the MFP 10 but may be changed separately in the separated apparatuses. In other words, one of the quantity of colors and the resolution may be set in the MFP 10, and the other may be set in the PC.

More specifically, it is possible that the user is not keen to set in the MFP 10 all the scanning parameters which can be set in the MFP 10 but may be satisfied when solely a part of the scanning parameters can be set in the MFP 10 and the remainder of the scanning parameters should be set in the PC. In consideration of such possibility, the scanning parameters which can be set in the MFP 10 may be individually validated to be set in the MFP 10 or validated to be set in the PC.

What is claimed is:

1. An image reading apparatus configured to perform an image reading operation using at least one parameter and configured to be connected with a plurality of external information processing apparatuses for mutual communication through a communication network, each of the plurality of external information processing apparatuses being configured to contain a parameter to be used in the image reading operation, the image reading apparatus comprising:
   a processor; and
   a memory storing computer readable instructions that, when executed by the processor, implement in the image reading apparatus:
   a specific parameter setting unit configured to set the at least one parameter to be used in the image reading operation based on a user's selection between a specific parameter modifiable in the image reading apparatus and the parameter contained in the plurality of external information processing apparatuses, the parameter contained in the plurality of external information processing apparatuses being provided from one of the plurality of external information processing apparatuses to the image reading apparatus, the parameter provided from the one of the plurality of external information processing apparatuses to the image reading apparatus being unmodifiable in the image reading apparatus;
   a selection accepting unit configured to accept the user's selection for the specific parameter set in the specific parameter setting unit to be validated over the parameter provided from the one of the plurality of external information processing apparatuses;
   an instruction receiving unit configured to receive input of a predetermined instruction to start reading of an image;
   a destination selecting unit configured to designate one of the plurality of external information processing apparatuses to be a destination of image data, which is generated through the image reading operation; and
   a notification transmitting unit configured to transmit a read-start notification to the designated one of the plurality of external information processing apparatuses through the communication network when the input of the predetermined instruction is received by the instruction receiving unit;
   a parameter receiving unit configured to receive the parameter and a read-start command being a command to the image reading apparatus to start the image reading operation transmitted from the designated one of the plurality of external information processing apparatuses through the communication network in response to receipt of the read-start notification from the notification transmitting unit, the parameter receiving unit being configured to store the parameter received from the designated one of the plurality of external information processing apparatuses in the memory;
   an image reading unit configured to read the image based on the at least one parameter; and
   a transmitting unit configured to transmit the image data generated based on the read image to the designated one of the plurality of external information processing apparatuses through the communication network,
   wherein the image reading unit reads the image, based on, at least with regard to the specific parameter set in the specific parameter setting unit, the specific parameter which was set by the specific parameter setting unit when the processer determines that the user's selection for the specific parameter set in the specific parameter to be validated over the parameter provided from the designated one of the plurality of external information processing apparatuses is accepted through the selection accepting unit; and based on the parameter received and stored in the memory by the parameter receiving unit when the processer determines that no selection for the specific parameter set in the specific parameter to be validated over the parameter provided from the designated one of the plurality of external information processing apparatuses is accepted through the selection accepting unit.

2. The image reading apparatus according to claim 1,
   wherein the computer readable instructions, when executed by the processor, further implement in the image reading apparatus a modification receiving unit configured to receive modification to the specific parameter set in the specific parameter setting unit;
   wherein the modification receiving unit is configured to receive the modification to the specific parameter by allowing the user to select one of optional configuration values prepared for the specific parameter; and
   wherein the specific parameter setting unit is configured to contain a preset default value for the specific parameter and to replace the preset default value with the modified specific parameter when the modification receiving unit receives the modification to the specific parameter.

3. The image reading apparatus according to claim 1,
   wherein the specific parameter set by the specific parameter setting unit is initially set in advance of the image reading operation; and
   wherein the specific parameter set by the specific parameter setting unit constitutes a part of the at least one parameter to be used in the image reading operation.

4. The image reading apparatus according to claim 1,
   wherein the specific parameter set by the specific parameter setting unit constitutes an entirety of the at least one parameter to be used in the image reading operation.

5. The image reading apparatus according to claim 1,
   wherein each of the plurality of information processing apparatuses is configured to transmit self-identifying information to the image reading apparatus along with the parameter when the information processing apparatus receives the read-start notification from the notification transmitting unit;
   wherein the image reading apparatus comprises a consistency judging unit, which is configured to judge consistency between the information processing apparatus who transmitted the parameter to the image reading apparatus and the designated one of the plurality of information processing apparatuses to which the read-start notification is transmitted after transmission of the read-start notification from the notification transmitting unit and after receipt of the parameter from the information processing apparatus based on the self-identifying information received along with the parameter and wherein the image reading apparatus is configured to read the image by use of the specific parameter set by the specific parameter setting unit when the consistency judging unit determines consistency between the information processing apparatus who transmitted the parameter to the image reading apparatus and the designated one of the plurality of information processing apparatuses to which the read-start notification is transmitted.

6. A method to read an image by an image reading apparatus configured to perform an image reading operation using at least one parameter and configured to be connected with a plurality of external information processing apparatuses for mutual communication through a communication network, each of the plurality of external information processing apparatuses being configured to contain a parameter to be used in the image reading operation, the method comprising:

setting the at least one parameter to be used in the image reading operation in the image reading apparatus based on a user's selection between a specific parameter modifiable in the image reading apparatus and the parameter contained in the plurality of external information processing apparatuses and, the parameter contained in the plurality of external information processing apparatuses being provided from one of the plurality of external information processing apparatuses to the image reading apparatus, the parameter provided from the one of the plurality of external information processing apparatuses to the image reading apparatus being unmodifiable in the image reading apparatus;

accepting the user's selection for the specific parameter to be validated over the parameter provided from the one of the plurality of external information processing apparatuses;

designating one of the plurality of external information processing apparatuses to be a destination of image data, which is generated through the image reading operation;

transmitting a read-start notification from the image reading apparatus to the designated one of the plurality of external information processing apparatuses through the communication network when a predetermined instruction to start reading of an image is received in the image reading apparatus;

receiving the parameter and a read-start command being a command to the image reading apparatus to start the image reading operation transmitted from the designated one of the plurality of external information processing apparatuses through the communication network in response to receipt of the read-start notification and storing the parameter received from the designated one of the plurality of external information processing apparatuses in a memory;

reading the image based on the at least one parameter; and transmitting the image data generated based on the read image to the designated one of the plurality of external information processing apparatuses through the communication network wherein the image is read, based on, at least with regard to the specific parameter set in the image reading apparatus, the specific parameter when the user's selection for the specific parameter set in the specific parameter to be validated over the parameter provided from the designated one of the plurality of external information processing apparatuses is accepted in the image reading apparatus; and based on the parameter received in the image reading apparatus and stored in the memory when no selection for the specific parameter set in the specific parameter to be validated over the parameter provided from the designated one of the plurality of external information processing apparatuses is accepted in the image reading apparatus.

7. An image reading system configured to perform an image reading operation through a communication network in accordance with at least one reading parameter, comprising:

a plurality of information processing apparatuses, each of which is configured to contain a reading parameter to be used in the image reading operation; and an image reading apparatus connected with the plurality of information processing apparatuses for mutual communication through the communication network, comprising:

a processor; and a memory storing computer readable instructions that, when executed by the processor, implement:

a specific parameter setting unit configured to set the at least one reading parameter to be used in the image reading operation in the image reading apparatus based on a user's selection between a specific parameter modifiable in the image reading apparatus and the reading parameter contained in the plurality of information processing apparatuses, the reading parameter contained in the plurality of information processing apparatuses being provided from one of the plurality of information processing apparatus to the image reading apparatus, the parameter provided from the one of the plurality of information processing apparatus to the image reading apparatus being unmodifiable in the image reading apparatus;

a selection accepting unit configured to accept the user's selection for the specific parameter set in the specific parameter setting unit to be validated over the reading parameter provided from the one of the plurality of information processing apparatuses;

an instruction receiving unit configured to receive input of a predetermined instruction to start reading of an image;

a destination selecting unit configured to designate one of the plurality of information processing apparatuses to be a destination of image data, which is generated through the image reading operation; and a notification transmitting unit configured to transmit a read-start notification to the designated one of the plurality of information processing apparatuses through the communication network when the predetermined instruction is received by the instruction receiving unit;

wherein each of the plurality of information processing apparatuses is configured to transmit the reading parameter and a read-start command being a command to the image reading apparatus to start the image reading operation to the image reading apparatus through the communication network in response to the read-start notification received from the image reading apparatus; and wherein the computer readable instructions, when executed by the processor, further implement:
  a receiving unit configured to receive the reading parameter and the read-start command transmitted from the designated one of the plurality of information processing apparatuses through the communication network in response to the read-start notification received from the notification transmitting unit, the receiving unit being configured to store the reading parameter received from the designated one of the plurality of information processing apparatuses in the memory;
  an image reading unit configured to read the image base on the at least one reading parameter; and
  a transmitting unit configured to transmit the image data generated based on the read image to the designated one of the plurality of information processing apparatuses through the communication network, wherein the image reading unit reads the image based on, at least with regard to the specific parameter set in the specific parameter setting unit, the specific parameter which was set by the specific parameter setting unit when the processer determines that the user's selection for the specific parameter set in the specific parameter to be validated over the reading parameter provided from the designated one of the plurality of information processing apparatuses is accepted through the selection accepting unit; and based on the parameter received and stored in the memory by the receiving unit when the processer determines that no selection for the specific parameter set in the specific parameter to be validated over the parameter provided from the designated one of the plurality of information processing apparatuses is accepted through the selection accepting unit.

8. The image reading apparatus according to claim 3, wherein, with regard to another part of the at least one parameter to be used in the image reading operation other than the specific parameter, the image reading unit reads the image based on the parameter provided from the designated one of the plurality of information processing apparatuses.

9. The image reading apparatus according to claim 1, wherein the computer readable instructions, when executed by the processor, further implement in the image reading apparatus a destination collecting unit configured to collect information of each of the plurality of external information processing apparatuses, the destination collecting unit being activated in response to activation of a push-scanning operation, in which reading is started according to the predetermined instruction to start reading of the image inputted in the image reading apparatus via a user interface unit, and the image data representing the read image is transferred to the designated one of the plurality of external information processing apparatuses after the reading is completed, for the image reading operation; and wherein the destination selecting unit designates the destination of the image data based on the information collected by the destination collecting unit.

10. The method according to claim 6, further comprising:
collecting information of each of the plurality of external information processing apparatuses in response to activation of a push-scanning operation, in which reading is started according to the predetermined instruction to start reading of the image inputted in the image reading apparatus via a user interface, and the image data representing the read image is transferred to the designated one of the plurality of external information processing apparatuses after the reading is completed, for the image reading operation, wherein the destination of the image data is designated based on the collected information of each of the plurality of information processing apparatuses.

11. The image reading system according to claim 7, wherein the computer readable instructions, when executed by the processor, further implement in the image reading apparatus a destination collecting unit configured to collect information of each of the plurality of information processing apparatuses, the destination collecting unit being activated in response to activation of a push-scanning operation, in which reading is started according to the predetermined instruction to start reading of the image inputted in the image reading apparatus via a user interface unit, and the image data representing the read image is transferred to the designated one of the plurality of information processing apparatuses after the reading is completed for the image reading operation; and wherein the destination selecting unit designates the destination of the image data based on the information collected by the destination collecting unit.

12. The image reading apparatus according to claim 1, wherein the memory comprises a flag setting area, in which a read-start flag indicating start of the image reading operation is set;

wherein the computer readable instructions in the memory, when executed by the processor, further implement in the image forming apparatus:
  a flag setting unit configured to set the read-start flag in the flag setting area in the memory in response to receipt of the input of the predetermined instruction in the instruction receiving unit; and
  a flag setting determining unit configured to determine whether the read-start flag is set in the flag setting area in the memory in response to receipt of the read-start command, the parameter, and header data transmitted from the designated one of the plurality of external information processing apparatuses, wherein the image reading unit is configured to read the image based on, at least with regard to the specific parameter among the at least one parameter to be used in the image reading operation, the specific parameter when the flag setting determining unit determines that the read-start flag is set in the flag setting area in the memory; and wherein the image reading unit is configured to read the image based on the parameter transmitted along with the read-start command from the designated one of the plurality of external information processing apparatuses without using the specific parameter which was set by the specific parameter setting unit when the flag setting determining unit determines that no read-start flag is set in the flag setting area in the memory.

13. The method according to claim 6, further comprising:
setting a read-start flag indicating start of the image reading operation in a flag setting area in a memory in the image reading apparatus in response to receipt of the input of the predetermined instruction in the image reading apparatus;
determining whether the read-start flag is set in the flag setting area in the memory in the image reading apparatus in response to receipt of the read-start command, the at least one parameter, and header data transmitted from the designated one of the plurality of external information processing apparatuses,
wherein the image is read based on, at least with regard to the specific parameter among the at least one parameter to be used in the image reading operation, the specific parameter when the flag setting determining unit determines that the read-start flag is set in the flag setting area in the memory; and
wherein the image is read based on the parameter transmitted along with the read-start command from the designated one of the plurality of external information processing apparatuses without using the specific parameter which was set by the specific parameter setting unit when the flag setting determining unit determines that no read-start flag is set in the flag setting area in the memory.

14. The image reading system according to claim 7,
wherein the memory in the image reading apparatus comprises a flag setting area, in which a read-start flag indicating start of the image reading operation is set;
wherein the computer readable instructions in the memory, when executed by the processor, further implement in the image reading apparatus:
a flag setting unit configured to set the read-start flag in the flag setting area in the memory in response to receipt of the input of the predetermined instruction in the instruction receiving unit; and
a flag setting determining unit configured to determine whether the read-start flag is set in the flag setting area in the memory in response to receipt of the read-start command, the parameter, and header data transmitted from the designated one of the plurality of information processing apparatuses,
wherein the image reading unit is configured to read the image based on, at least with regard to the specific parameter among the at least one parameter to be used in the image reading operation, the specific parameter when the flag setting determining unit determines that the read-start flag is set in the flag setting area in the memory; and
wherein the image reading unit is configured to read the image based on the parameter transmitted along with the read-start command from the designated one of the plurality of information processing apparatuses without using the specific parameter which was set by the specific parameter setting unit when the flag setting determining unit determines that no read-start flag is set in the flag setting area in the memory.

15. The image reading apparatus according to claim 1, wherein the communication between the image reading apparatus and the plurality of external information processing apparatuses includes both wired communication and wireless communication.

16. The method according to claim 6, wherein the communication between the image reading apparatus and the plurality of external information processing apparatuses includes both wired communication and wireless communication.

17. The image reading system according to claim 7, wherein the communication between the image reading apparatus and the plurality of information processing apparatuses includes both wired communication and wireless communication.

18. The image reading apparatus according to claim 1, wherein the communication network comprises a local area network (LAN).

19. The image reading apparatus according to claim 18, wherein the LAN comprises a wireless LAN.

20. The image reading apparatus according to claim 18, wherein the LAN comprises a wired LAN.

21. The image reading apparatus according to claim 1,
wherein the specific parameter includes a plurality of specific parameters; and
wherein validity of each of the plurality of specific parameters and the parameter provided from the designated one of the plurality of external information processing apparatuses is individually selectable.

22. The method according to claim 6,
wherein the specific parameter includes a plurality of specific parameters; and
wherein validity of each of the plurality of specific parameters and the parameter provided from the designated one of the plurality of external information processing apparatuses is individually selectable.

23. The image reading system according to claim 7,
wherein the specific parameter includes a plurality of specific parameters; and
wherein validity of each of the plurality of specific parameters and the parameter provided from the designated one of the plurality of information processing apparatuses is individually selectable.

24. The image reading apparatus according to claim 5,
wherein the computer readable instructions, when executed by the processor, further implement in the image reading apparatus an error information transmitting unit configured to transmit predetermined error information to the one of the plurality of external information processing apparatuses that transmitted the read-start command to the image reading apparatus when the consistency judging unit determines inconsistency between the one of the plurality of external information processing apparatuses that transmitted the read-start command to the image reading apparatus and the designated one of the plurality of external information processing apparatuses to which the read-start notification was transmitted,
wherein the image reading unit is configured to avoid the image reading operation in accordance with the parameter received by the parameter receiving unit when the consistency judging unit determines inconsistency between the one of the plurality of external information processing apparatuses that transmitted the read-start command to the image reading apparatus and the designated one of the plurality of external information processing apparatuses to which the read-start notification was transmitted.

* * * * *

UNITED STATES PATENT AND TRADEMARK OFFICE
CERTIFICATE OF CORRECTION

PATENT NO. : 9,952,818 B2
APPLICATION NO. : 13/853246
DATED : April 24, 2018
INVENTOR(S) : Seiji Tsuya It is certified that error appears in the above-identified patent and that said Letters Patent is hereby corrected as shown below:

In the Claims

Column 21, Claim 13, Line 10 should be corrected to read:
the parameter, and header data transmitted Signed and Sealed this
Eighteenth Day of September, 2018

Andrei Iancu
*Director of the United States Patent and Trademark Office*